(12) United States Patent
Park

(10) Patent No.: US 9,238,455 B2
(45) Date of Patent: Jan. 19, 2016

(54) CHAMBER CASE OF BRAKE CHAMBER OF VEHICLE

(71) Applicant: G&P AUTOMOTIVE CO., LTD., Jeollabuk-do (KR)

(72) Inventor: Han Joo Park, Jeollabuk-do (KR)

(73) Assignee: G&P AUTOMOTIVE CO., LTD., Jeollabuk-do (KR)

( * ) Notice: Subject to any disclaimer, the term of this patent is extended or adjusted under 35 U.S.C. 154(b) by 3 days.

(21) Appl. No.: 14/246,317

(22) Filed: Apr. 7, 2014

(65) Prior Publication Data

US 2014/0305758 A1    Oct. 16, 2014

(30) Foreign Application Priority Data

Apr. 10, 2013    (KR) .................. 10-2013-0039130

(51) Int. Cl.
*B60T 13/04*    (2006.01)
*B60T 17/08*    (2006.01)

(52) U.S. Cl.
CPC ............. *B60T 17/083* (2013.01); *B60T 17/086* (2013.01); *B60T 17/088* (2013.01)

(58) Field of Classification Search
CPC .... B60T 17/083; B60T 17/085; B60T 17/086
USPC .................. 303/9.76; 92/63, 130 R
See application file for complete search history.

(56) References Cited

U.S. PATENT DOCUMENTS

| | | | | |
|---|---|---|---|---|
| 3,181,433 | A | * | 5/1965 | Cruse ............................. 92/63 |
| 3,205,020 | A | * | 9/1965 | Schubert ........................ 303/29 |
| 3,774,507 | A | * | 11/1973 | Page et al. .................. 92/130 R |
| 3,926,094 | A | * | 12/1975 | Kurichh et al. .................... 92/63 |
| 4,223,953 | A | * | 9/1980 | Cruse ........................... 303/9.76 |
| RE32,885 | E | * | 3/1989 | Graham ...................... 303/9.76 |
| 6,477,939 | B1 | * | 11/2002 | Siebke ........................ 92/130 R |
| 2006/0131116 | A1 | * | 6/2006 | Plantan et al. .................... 303/7 |
| 2009/0159383 | A1 | * | 6/2009 | Roberts et al. ................ 188/305 |

* cited by examiner

*Primary Examiner* — Thomas J Williams

(57) ABSTRACT

Provided is a chamber case of a brake chamber of a vehicle, which may reduce the weight of a vehicle by applying a plastic resin-based material to the chamber case and also enhance rigidity and durability of the chamber case by forming a reinforcement rib at the chamber case and adjusting a thickness of the chamber case to reinforce weak portions of the chamber case. The chamber case of a brake chamber of a vehicle is configured to surround a power spring and a piston, and a top portion of the chamber case is formed to have a relatively greater thickness than a side portion thereof to reinforce the strength of the chamber case.

15 Claims, 5 Drawing Sheets

< PRIOR ART >

< PRIOR ART >

CHAMBER CASE OF BRAKE CHAMBER OF VEHICLE

CROSS-REFERENCE TO RELATED APPLICATION

This application claims priority of Korean Patent Application No. 10-2013-0039130, filed on Apr. 10, 2013, in the KIPO (Korean Intellectual Property Office), the disclosure of which is incorporated herein entirely by reference.

BACKGROUND OF THE INVENTION

1. Field of the Invention

The present disclosure relates to a chamber case of a brake chamber of a vehicle, which allows the brake chamber to have a reduced weight and improved durability.

2. Description of the Related Art

A pneumatic brake system such as an air brake has been used for controlling a medium-sized or large-sized commercial vehicle, particularly a large and heavy vehicle such as a truck or a bus, to run or stop due to its safety and easy operability.

However, in order to control such a large vehicle to run at a high speed, the brake should be operated more sensitively and more rapidly due to the weight of its load, and substantially an air brake having a strong braking force is demanded.

In an air brake system, a most essential part is a brake chamber which makes a stroke of 64 mm with a force of, for example, 1800 kgf by using air pressure.

FIGS. 1 and 2 are cross-sectional views showing an operating state of a general spring-type brake chamber, and the brake chamber includes a spring chamber 11 and a service chamber 12 disposed at upper and lower portions, respectively.

The spring chamber 11 includes a power spring 13 installed therein and generating a force for operating a vehicle brake by an elastic restoring force, a first diaphragm 14 for compressing the power spring 13 by upward deformation caused by an air pressure, a piston 16 installed at an upper surface of the first diaphragm 14 to transmit a compression force to the power spring 13, and a piston rod 17 vertically moving through a hole of a barrier 10 between the spring chamber 11 and the service chamber 12 in an axial direction.

At this time, when the power spring 13 is compressed, the top portion of the power spring 13 is guided by a spring guide 22 installed at an upper inner side of the spring chamber 11, and the bottom portion of the power spring 13 is placed on and supported by a flange portion of the piston 16.

In addition, a first spring 19 is installed between the first diaphragm 14 and the barrier 10, and the first diaphragm 14 is elastically supported by the first spring 19.

Moreover, the service chamber 12 includes a second diaphragm 15 deformed upwards by an air pressure or a force received from the piston rod 17, a push rod 18 connected to the second diaphragm 15 and drawn through a lower through hole of the service chamber 12, and a crevice 21 configured to connect an end of the push rod 18 to a vehicle brake operating mechanism and also operate or release the vehicle brake by a lifting operation of the push rod 18.

At this time, the second spring 20 is installed between a connection plate of the push rod 18 and a bottom portion of the service chamber 12, and the second diaphragm 15 is elastically supported by the second spring 20.

In this configuration, the brake actuator operates as follows.

For example, when the brake is released or a vehicle runs normally, a compressed air is introduced into the spring chamber 11 as shown in FIG. 1.

An edge portion of the first diaphragm 14 is deformed upwards due to the pressure of the compressed air introduced to the spring chamber 11, the power spring 13 is compressed by the air pressure transferred through the piston 16, and the piston rod 17 connected to the first diaphragm 14 is inserted into the spring chamber 11.

Subsequently, as the piston rod 17 moves upwards, the second diaphragm 15 is deformed upwards by the elastic restoring force of the second spring 20, so that the push rod 18 is inserted into the service chamber 12 and the vehicle brake is released by the crevice 21 connected to the push rod 18.

In addition, when the brake is in operation, as shown in FIG. 2, as the air in the spring chamber 11 discharges out, the air pressure applied to the power spring 13 through the first diaphragm 14 and the piston 16 is released, and thus the power spring 13 is expanded by the elastic restoring force.

Subsequently, as the edge portion of the first diaphragm 14 is deformed downwards by the elastic restoring force of the power spring 13, the piston rod 17 is moved downwards, and accordingly the second diaphragm 15 is deformed downwards by receiving, a pressing force from the piston rod 17.

In addition, as the push rod 18 connected to the second diaphragm 15 is drawn from the service chamber 12, the vehicle brake is operated by the crevice 21 connected to the bottom portion of the push rod 18.

Meanwhile, in the general spring chamber, a chamber case surrounding the power spring or the like is made of steel material, and the chamber case made of steel material becomes a factor of increasing the weight of a vehicle.

Therefore, it is demanded to design a chamber case made of lighter material in order to reduce weight of the vehicle.

SUMMARY OF THE INVENTION

An embodiment of the present invention is directed to providing a chamber case of a brake chamber of a vehicle, which may reduce the weight of a vehicle by applying a plastic resin-based material to the chamber case and also enhance rigidity and durability of the chamber case by forming a reinforcement rib at the chamber case and adjusting a thickness of the chamber case to reinforce weak portions of the chamber case.

In one general aspect, there is provided a chamber case of a brake chamber of a vehicle, which is configured to surround a power spring and a piston, and a top portion of the chamber case is formed to have a relatively greater thickness than a side portion thereof to reinforce the strength of the chamber case.

Reinforcement ribs may be formed at an outer surface of the chamber case at regular intervals in a circumferential direction of the chamber case.

The chamber case is made of a plastic/nylon resin or a sheet molding compound (SMC).

A first spring guide formed to protrude with a radius gradually increasing in a circumferential direction and a second spring guide formed to successively protrude in a circumferential direction at regular intervals in a radial direction at a center portion of an inner upper surface of the chamber case may be provided at the inner upper surface of the chamber case to guide the power spring.

The chamber case of a brake chamber of a vehicle according to the present disclosure gives the following advantages.

Since the material of the chamber case is changed from an existing steel material to a plastic resin material, the weight of a vehicle may be reduced. In addition, since a top portion of the chamber case is formed to have a greater thickness than a side portion thereof and also a reinforcing protrusion is formed at an outer surface of the chamber case, the rigidity of the chamber case with respect to a compression force of the power spring may be reinforced and thus the durability of the chamber case may be enhanced.

BRIEF DESCRIPTION OF THE DRAWINGS

The above and other features and advantages will become more apparent to those of ordinary skill in the art by describing in detail exemplary embodiments with reference to the attached drawings, in which.

In the following description, the same or similar elements are labeled with the same or similar reference numbers.

DETAILED DESCRIPTION

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

Figure 1:
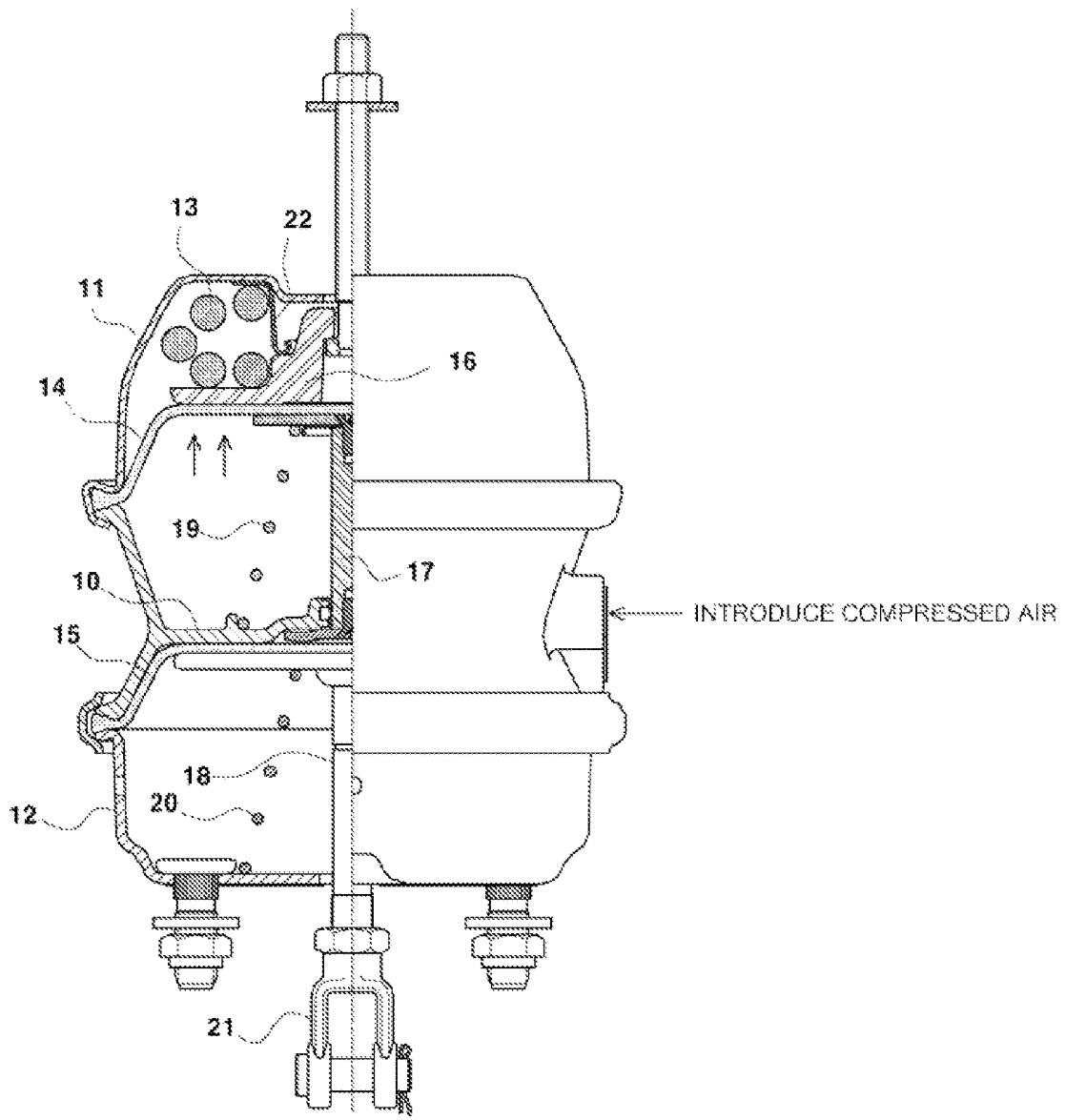
FIGS. 1 and 2 are cross-sectional views showing operating states of a general brake chamber.
Figure 2:
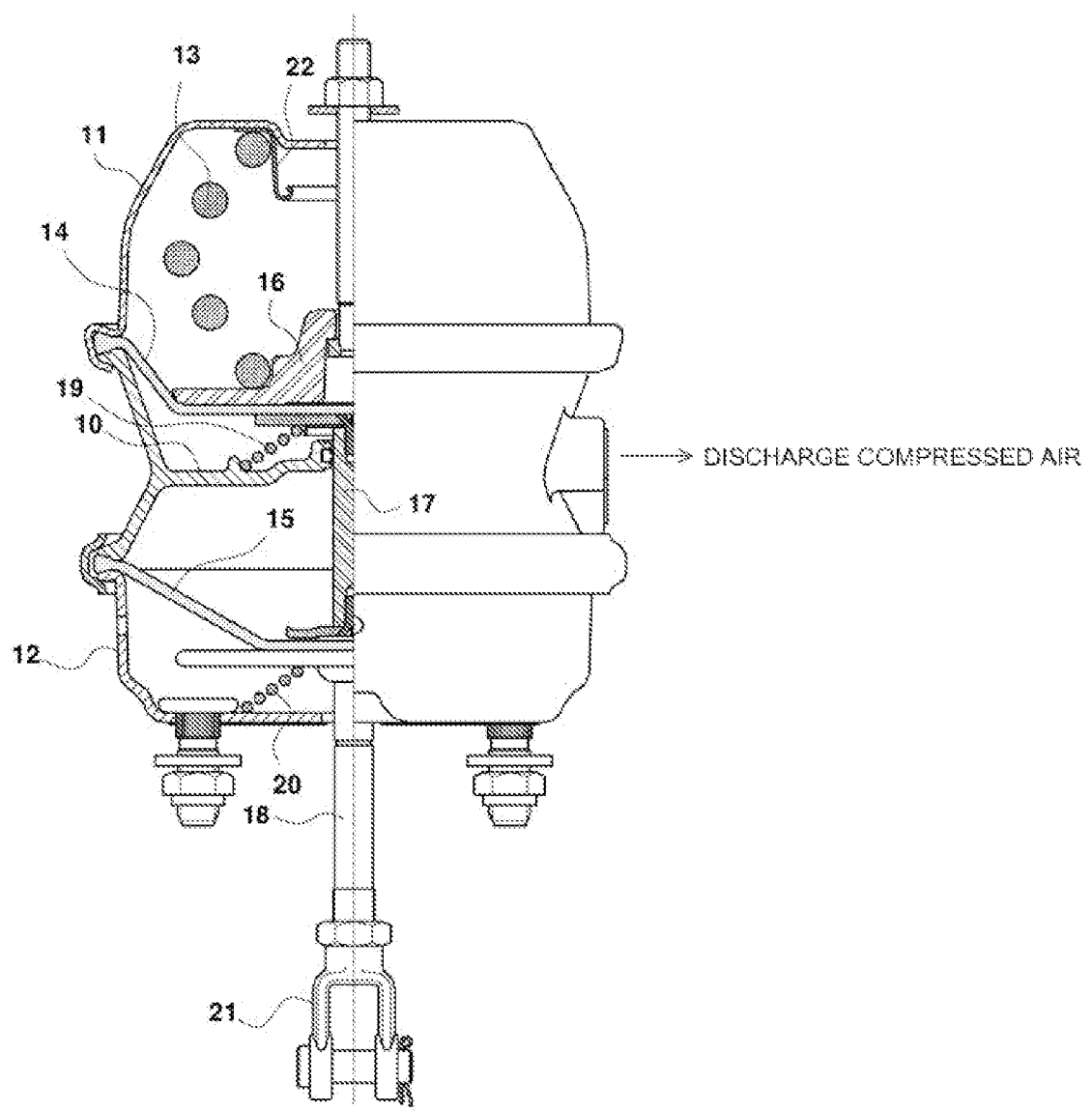
Figure 3:
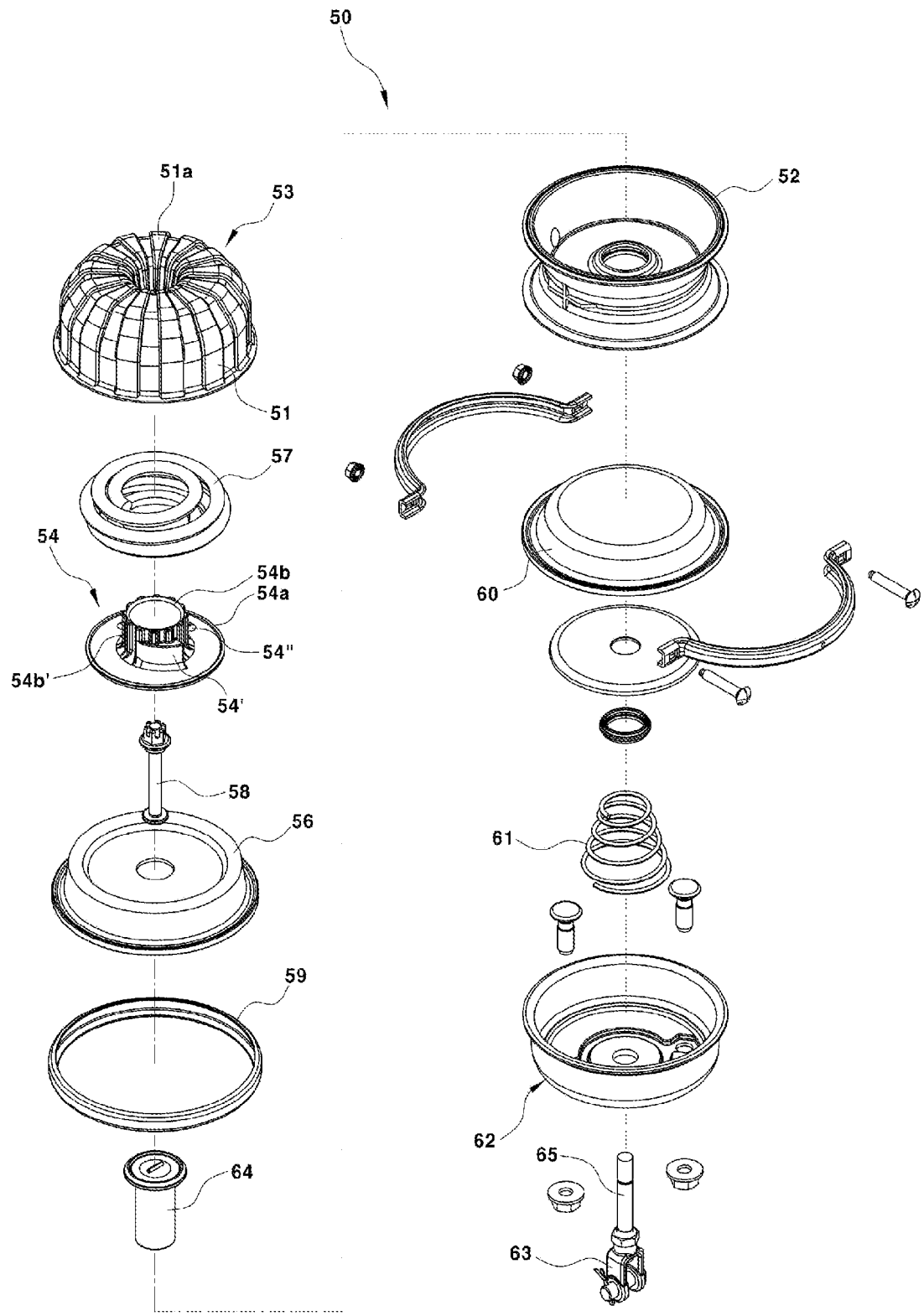
FIG. 3 is an exploded perspective view showing a brake chamber according to the present disclosure.
Figure 4:
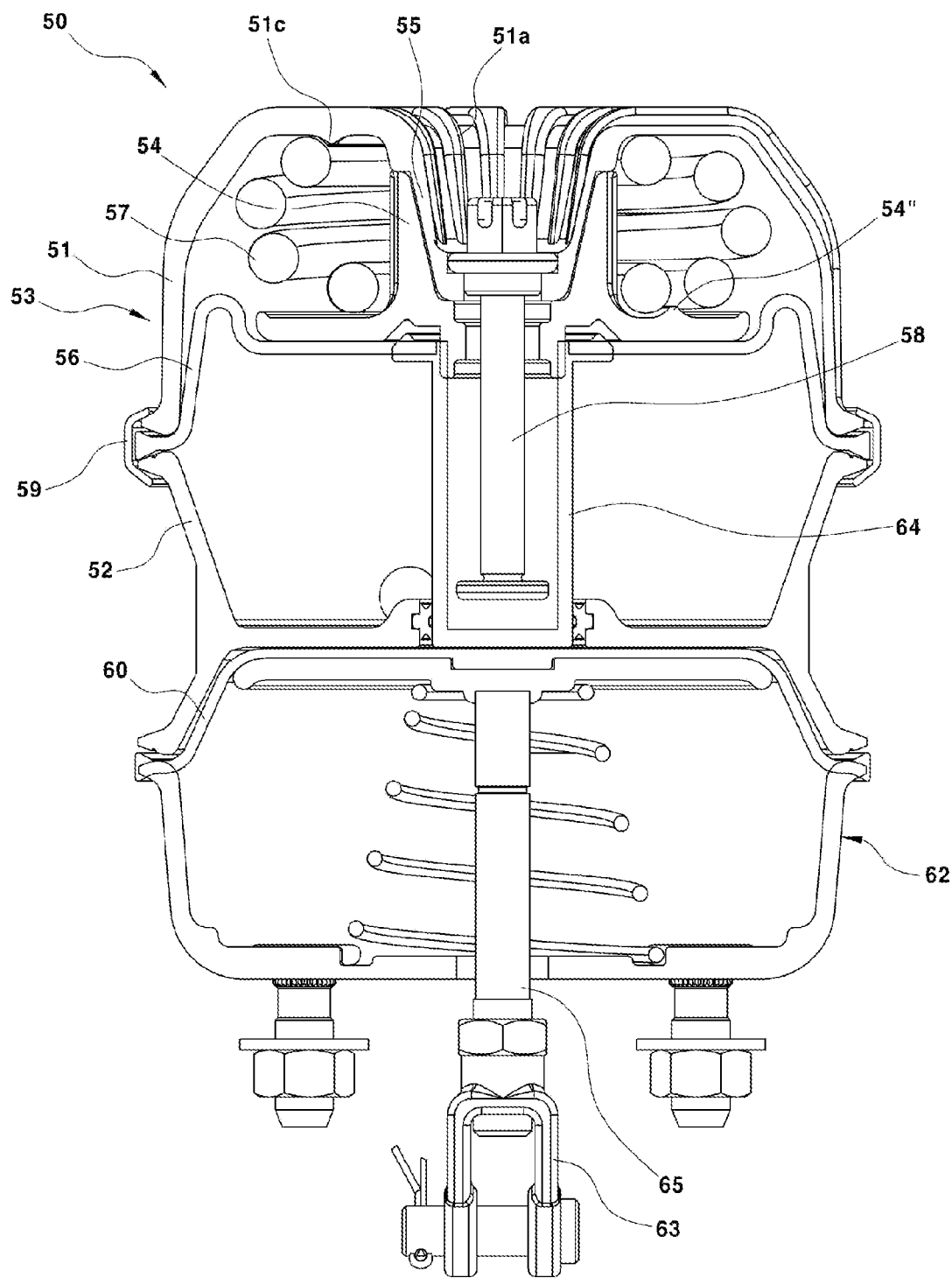
FIG. 4 is a cross-sectional view showing a brake chamber according to the present disclosure.
Figure 5:
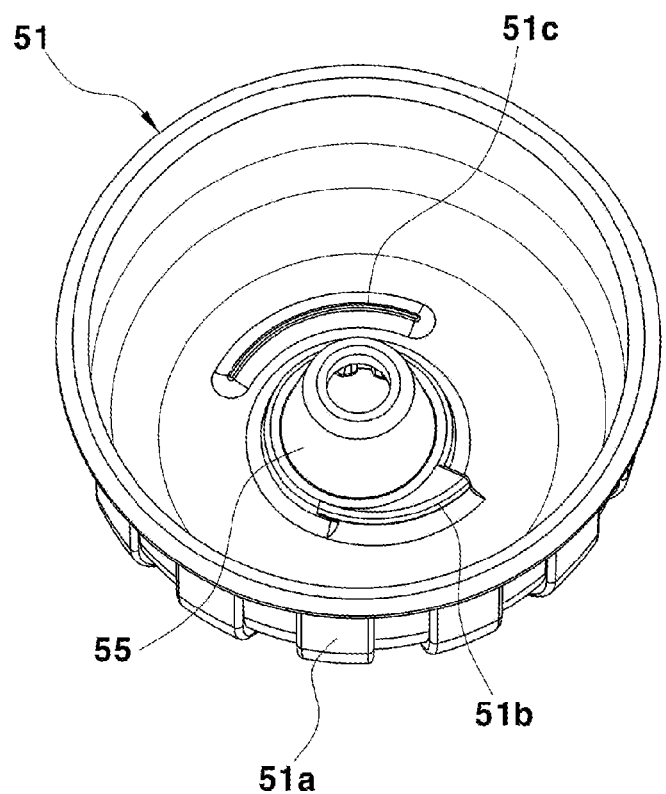
FIG. 5 is a perspective view showing an inner configuration of a chamber case according to the present disclosure.
Figure 6:
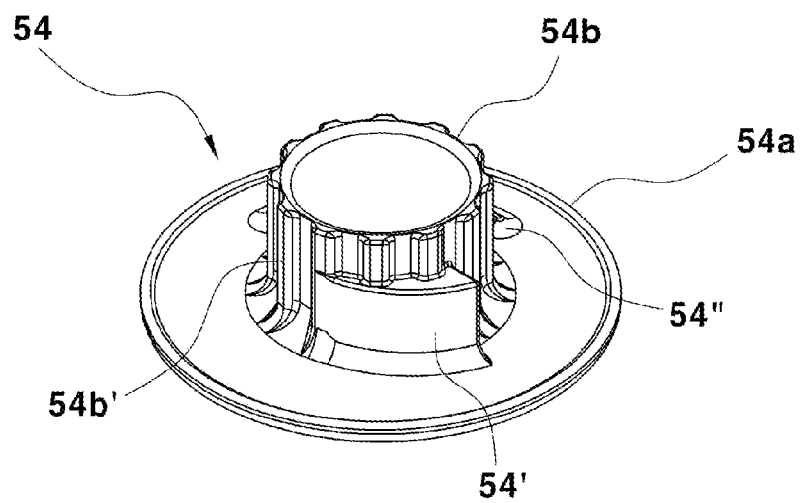
FIG. 6 is a perspective view showing a piston according to the present disclosure.

FIG. 3 is an exploded perspective view showing a brake chamber according to the present disclosure, FIG. 4 is a cross-sectional view showing a brake chamber according to the present disclosure, FIG. 5 is a perspective view showing an inner configuration of a chamber case according to the present disclosure, and FIG. 6 is a perspective view showing a piston according to the present disclosure.

The present disclosure is directed to a chamber case 51 of a brake chamber 50 of a vehicle, which may reduce the weight of a vehicle and also enhance rigidity and durability by changing a structure, shape and material of the chamber case 51.

Since the brake chamber 50 according to the present disclosure has configurations and operations similar to those of an existing brake chamber 50, such similar configurations and operations will not be described in detail, and distinctive portions of the present disclosure will be described in detail.

An essential component of the present disclosure is the chamber case 51 configured to surround a power spring 57 or the like in a brake chamber 50.

The chamber case 51 is coupled to an upper portion of an intermediate case 52 by a clamp 59 to cover the upper portion of the intermediate case 52, and has a dome structure surrounding internal components of the spring chamber 53, for example a power spring 57, a piston 54, a first diaphragm 56 or the like.

The chamber case 51 is made of a plastic/nylon resin or a plastic resin-based sheet molding compound (SMC), for example PA66+ GF60%, and the sheet molding compound (SMC) is generally prepared by adding an oxide or hydroxide of alkali earth metal serving as a viscosity agent to a liquid resin composition in which an unsaturated polyester resin, a polymeric monomer, a hardener, an inorganic filler, a releasing agent, a flame retardant or the like are mixed, and impregnating the liquid resin composition with a glass fiber reinforcement to be thickened into a sheet form with a sandwich shape on a releasing film. However, it should be noted that the listing of the above materials should not be seen as to limit the scope of the present invention. Other materials may be used without departing from the spirit and scope of the present invention.

The plastic resin prepared as above is thermally molded in a mold into a final product, which has thermal resistance, waterproofing property, chemical resistance and high strength and is also capable of contributing to weight lighting of a vehicle in the present disclosure.

In addition, when the material of the chamber case 51 is changed into a plastic resin, the strength of the chamber case 51 should be maintained over the strength of an existing chamber case 51, and a portion of the chamber case 51 which receives a greatest force should be reinforced.

For this, reinforcement ribs 51a may be formed at an outer surface of the chamber case 51 to protrude in a radial direction from an edge portion of the chamber case 51 toward its center portion, thereby improving the strength of the chamber case 51.

The reinforcement ribs 51a protrude at regular intervals in a circumferential direction, and intervals of the reinforcement ribs 51a (in a circumferential direction) gradually decrease as being closer to the center portion of the chamber case 51.

The top portion of the chamber case 51 has a greater thickness than the side portion thereof. Since the top portion of the chamber case 51 receives a greater force in comparison to the side portion, the greater thickness of the top portion of the chamber case 51 enhances the durability of the chamber case 51.

For example, when a brake of the brake chamber 50 is released, if the power spring 57 installed between the chamber case 51 and the piston 54 is compressed, the elastic restoring force of the power spring 57 is applied to an inner top surface of the chamber case 51.

This operation of the brake chamber 50 continuously repeats whenever a driver operates the brake. Therefore, if the top portion of the chamber case 51 has a greater thickness than the side portion, an internal resisting force against the elastic restoring force of the power spring 57 is enhanced, thereby improving the durability of the chamber case 51, and further the durability of the brake chamber 50.

At this time, the chamber case 51 has a relatively smaller thickness at its side portion, and an inclined portion at the upper side portion of the chamber case 51 and the top portion of the chamber case 51 have relatively greater thickness than the side portion of the chamber case 51.

A guide portion 55 is formed at the center portion of the chamber case 51 to protrude downwards, thereby regulating a maximum lifting height of the piston 54.

The guide portion 55 is shaped to be concaved downwards at the center portion of the chamber case 51, when being observed from the outside of the chamber case 51, and shaped to protrude downwards at the center portion of the chamber case 51, when being observed from the inside of the chamber case 51.

In addition, the guide portion 55 has a conical shape whose diameter gradually decreases in a downward direction.

Moreover, a through hole is formed in the bottom surface of the guide portion 55, so that a bolt 58 may be inserted into the through hole.

The piston 54 includes a disk-shaped base portion 54a making a surface contact with the first diaphragm 56, and a circular protrusion 54b protruding on the center portion of the base portion 54a.

At this time, the protrusion 54b has a circular inner portion and is shaped to have a diameter gradually decreasing in a downward direction from the top of the protrusion 54b, so that the guide portion 55 may be easily inserted thereto.

The power spring 57 is installed between the top portion of the chamber case 51 and the base portion 54a of the piston 54. If a compression force is received from the first diaphragm 56 and the piston 54 by a compressed air, the power spring 57 is compressed, and if the compressed air discharges out from the inside of the spring chamber 53 to release the compression force of the compressed air, the power spring 57 is restored to its original location by the elastic restoring force of the power spring 57.

Here, first and second spring guides 51b, 51c are formed at the inner upper surface of the chamber case 51 to guide the power spring 57 when the power spring 57 is compressed or restored to its original location.

The first spring guide 51b is formed to protrude on the top of the guide portion 55 of the chamber case 51 so that its radius gradually increases as being closer to its circumference, and a connection portion of the first spring guide 51b and the chamber case 51 is rounded so that the power spring 57 may be easily placed on the rounded portion of the first spring guide 51b and the chamber case 51.

In addition, the second spring guides 51c are formed to protrude at the guide portion 55 of the chamber case 51 in a circumferential direction at regular intervals in a radial direction, and a connection portion of the second spring guide 51c and the chamber case 51 is rounded, so that the power spring 57 may be easily placed on the rounded portion of the second spring guide 51c and the chamber case 51.

If the first and second spring guides 51b, 51c are formed at the inner top surface of the chamber case 51 as described above, the power spring 57 may maintain its shape without being distorted when being compressed or restored to its original location, thereby enhancing the durability of the power spring 57.

A first spring guide 54' protrudes between the base portion 54a of the piston 54 and the protrusion 54b to have a radius gradually increasing as being closer to the circumference, and second spring guides 54" is formed at the base portion 54a of the piston 54 to protrude on the protrusion 54b in a circumferential direction at regular intervals in a radial direction.

The first and second spring guides 54', 54" formed at the piston 54 are located diagonally symmetrical to the first and second spring guides 51b, 51c formed at the chamber case 51 to guide and support the power spring 57 when the power spring 57 is compressed or restored to its original location, thereby enhancing the durability of the power spring 57.

In addition, reinforcing protrusions 54b' are formed at a side of the protrusion 54b of the piston 54 at regular intervals in a circumferential direction, thereby enhancing the strength of the piston 54.

At this time, the piston 54 may be made of plastic material.

Therefore, in the present disclosure, since the material of the chamber case 51 is changed from an existing steel material to a plastic resin material, the weight of a vehicle may be reduced. In addition, since the top portion of the chamber case 51 is formed to have a greater thickness than the side portion thereof and also the reinforcement ribs are formed at the outer surface of the chamber case 51, the rigidity of the chamber case 51 with respect to a compression force of the power spring may be reinforced and thus the durability of the chamber case 51 may be enhanced.

Reference characters 60, 61, 62, 63, 64, 65 are noting second diaphragm, second spring, service chamber, crevice, piston rod and push rod respectively.

While the present disclosure has been described with reference to the embodiments illustrated in the figures, the embodiments are merely examples, and it will be understood by those skilled in the art that various changes in form and other embodiments equivalent thereto can be performed. Therefore, the technical scope of the disclosure is defined by the technical idea of the appended claims The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A chamber case of a brake chamber of a vehicle, wherein the chamber case is configured to surround a power spring and a piston, and a top portion of the chamber case is formed to have a relatively greater thickness than a side portion thereof to reinforce the strength of the chamber case,
   wherein a first spring guide formed to protrude with a radius gradually increasing in a circumferential direction and a second spring guide formed to successively protrude in a circumferential direction at regular intervals in a radial direction at a center portion of an inner upper surface of the chamber case are provided at the inner upper surface of the chamber case to guide the power spring.

2. The chamber case of a brake chamber of a vehicle of claim 1, wherein reinforcement ribs are formed at an outer surface of the chamber case at regular intervals in a circumferential direction of the chamber case.

3. The chamber case of a brake chamber of a vehicle of claim 2, wherein the reinforcement ribs are formed in a radial direction from an edge portion of the chamber case towards a center portion of the chamber case.

4. The chamber case of a brake chamber of a vehicle of claim 1, wherein the chamber case is made of a plastic/nylon resin.

5. The chamber case of a brake chamber of a vehicle of claim 1, wherein the chamber case is made of a sheet molding compound.

6. The chamber case of a brake chamber of a vehicle of claim 1, wherein a guide portion is formed at the center portion of the chamber case to protrude downward.

7. The chamber case of a brake chamber of a vehicle of claim 6, wherein the guide portion is shaped to be concaved downwards at the center portion of the chamber case.

8. The chamber case of a brake chamber of a vehicle of claim 7, wherein the guide portion has a conical shape whose diameter gradually decrease in a downward direction.

9. The chamber case of a brake chamber of a vehicle of claim 6, wherein reinforcement ribs are formed at an outer surface of the chamber case at regular intervals in a circumferential direction of the chamber case.

10. The chamber case of a brake chamber of a vehicle of claim 3, wherein a guide portion is formed at the center portion of the chamber case to protrude downward.

11. The chamber case of a brake chamber of a vehicle of claim 10, wherein the guide portion is shaped to be concaved downwards at the center portion of the chamber case.

12. The chamber case of a brake chamber of a vehicle of claim 11, wherein the guide portion has a conical shape whose diameter gradually decrease in a downward direction.

13. The chamber case of a brake chamber of a vehicle of claim 9, wherein the reinforcement ribs are formed in a radial direction from an edge portion of the chamber case towards a center portion of the chamber case.

14. The chamber case of a brake chamber of a vehicle of claim 9, wherein the chamber case is made of a plastic/nylon resin.

15. The chamber case of a brake chamber of a vehicle of claim 9, wherein the chamber case is made of a sheet molding compound.

* * * * *